Dec. 25, 1928.　　　　　　　　　　　　　　1,696,864
R. V. ROBERTSON
POTATO PLANTING ATTACHMENT FOR LISTERS
Filed Oct. 17, 1927　　　2 Sheets-Sheet 1
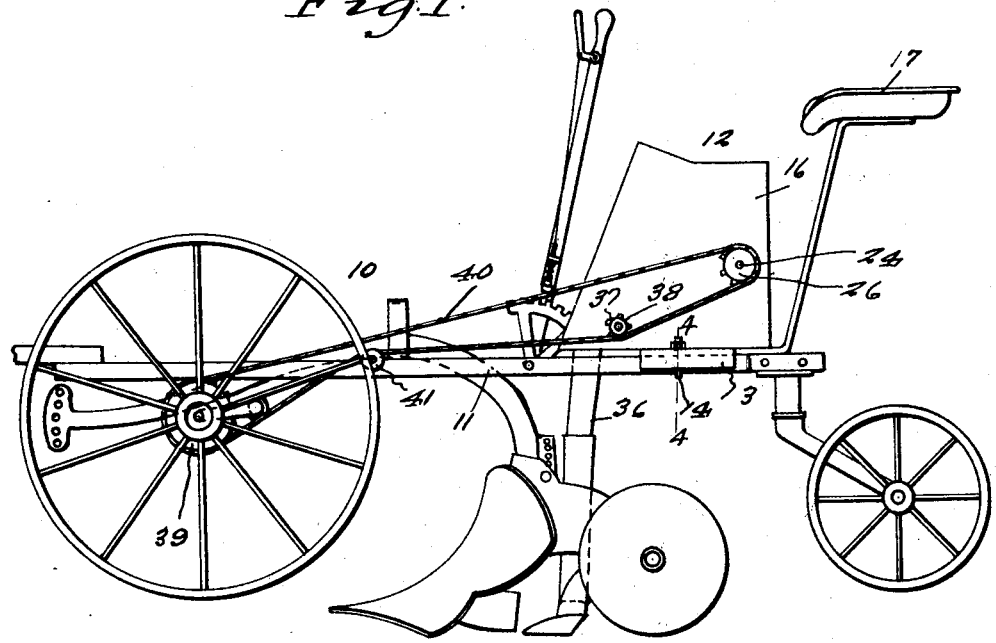

Dec. 25, 1928.  
R. V. ROBERTSON  
1,696,864  
POTATO PLANTING ATTACHMENT FOR LISTERS  
Filed Oct. 17, 1927  2 Sheets-Sheet 2
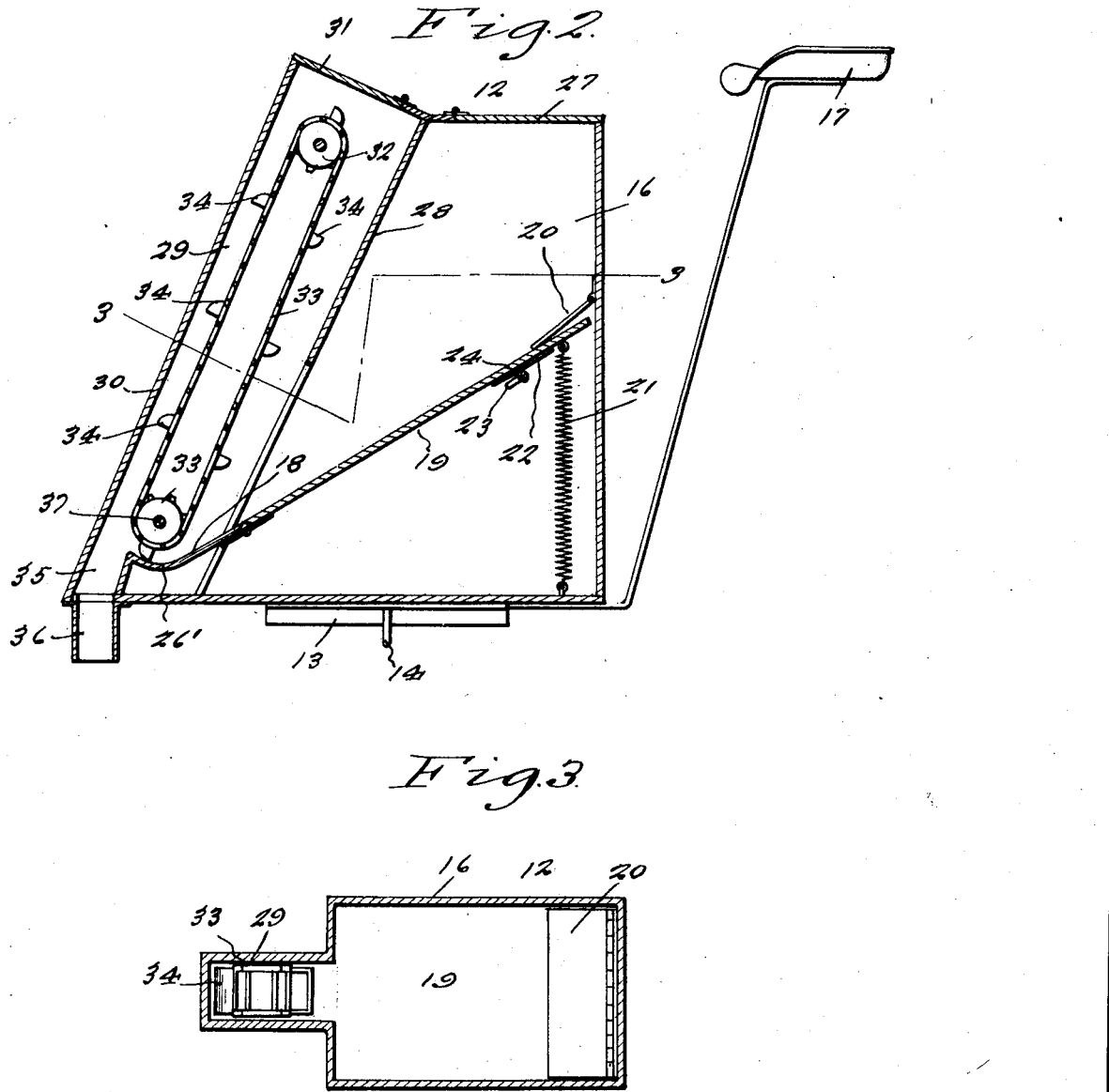

Patented Dec. 25, 1928.

1,696,864

UNITED STATES PATENT OFFICE.

RICHARD VIRGIL ROBERTSON, OF WAUNETA, NEBRASKA.

POTATO-PLANTING ATTACHMENT FOR LISTERS.

Application filed October 17, 1927. Serial No. 226,803.

My present invention has reference to a potato planting attachment for listers, and my primary object is the provision of an attachment for this purpose which may be easily, quickly and securely fixed on the frame of a lister and which includes a hopper having a false bottom that comprises a fixed and a hinged section, the fixed section delivering to the bottom of an elevator that is arranged at an angle and in an angular compartment at the front of the hopper, the buckets on the elevator receiving the cut potatoes from the hopper, and singly directing the same into a seed spout that is directed between the plow and the covering discs of the lister, there being means operated by the turning of the wheels of the lister for actuating the elevator and for imparting a swinging movement to the hinged section of the false bottom of the hopper.

To the attainment of the above broadly stated objects and many others which will present themselves as the nature of the invention is better understood, the improvement resides in certain other novel features of construction, combination and operative association of parts, one satisfactory embodiment of which is disclosed by the accompanying drawings.

In the drawings:

Figure 1 is a side elevation of a lister having my attachment thereon.

Figure 2 is an approximately central vertical longitudinal sectional view through the improvement.

Figure 3 is a horizontal sectional view on the line 3—3 of Figure 2.

Figure 4 is a detail sectional view approximately on the line 4—4 of Figure 1.

Figure 5 is an elevation of a portion of the elevator, parts being in section.

In attaching my improvement to the frame of a lister, I remove the seat, seed box and subsoiler. The lister is broadly indicated in Figure 1 of the drawings by the numeral 10. The frame 11 of the lister has arranged thereon my improvement which is broadly indicated by the numeral 12. The flat bottom of the attachment is provided with outstanding plates having hooked ends 13 to engage with the side bars of the lister frame 11. There are passed through these plates the threaded shanks of the hooks 14 which also engage with the frame member 11, and the threaded ends of the hooks have screwed thereon sustaining nuts 15.

My attachment 12 includes a hopper 16 to whose bottom there is fixed the support for a seat 17. In the hopper there is a false inclined bottom that comprises a fixed section 18 and a hinged section 19. Above the hinged section 19 of the false bottom and hingedly secured to the back of the compartment providing the hopper 16, there is a directing plate 20. This plate has its outer edge in contact with the hinged section 19 of the false bottom. Between the false bottom and the fixed bottom of the attachment there is secured the ends of a coil spring 21, and on the under face of the hinged section 19 of the false bottom there is a wear plate 22 designed to be contacted by a lug 23 secured on a shaft 24 whose ends find bearings through openings in the sides of the attachment 12. On one end of the shaft 25 there is fixed a sprocket wheel 26. As far as the description has progressed it will be apparent that the spring 21 will influence the hinged section 19 of the false bottom to cause the wear plate thereof to rest on the shaft 25, and it will be further apparent that the turning of the said shaft 25 will cause the lug 23 thereon to intermittently knock against the wear plate 22 and thereby swing the hinged section 19 of the false bottom against the influence of the spring 21 to cause the pieces of potatoes resting on the false bottom to be agitated and to gravitate thereon and to be directed into a rounded or trough portion 26' at the outer end of the fixed section 18 of the false bottom. The hopper 16 has its top normally closed by a hinged door 27 and the front face of the hopper is disposed at an angle, the said hopper being gradually increased in width from the top to the bottom thereof. The front wall of the hopper extends a suitable distance from the top of the hopper, but terminates a considerable distance away from the false bottom of the hopper. The front 28, at the center of the hopper provides the inner wall of the elevator compartment 29. The outer wall 30 of the elevator compartment 29 is also arranged at an angle, the inclination of which being such that the said compartment gradually increases in width from its bottom to the top portion thereof, and the top of the compartment is normally closed by a hinged door 31. Trained around sprocket wheels 32 and 33 adjacent to the top and bottom of the compartment 29 there is the endless chain 33 for the elevator. The outer lead of the chain 33 is arranged at the same angle as the outer wall 30 of the compartment 29. The links constituting the chain 33 are removably connected as clearly disclosed by Figure 5 of the drawings and on certain of these links there are fixed buckets 34 that travel singly through the rounded or gutter end 26′ of the section 18 of the false bottom for the hopper and whereby the potatoes will be singly received in the buckets, raised by the upward travel of the inner lead of the chain over the sprocket wheel 32 and from thence permitted to gravitate in the space between the wall 30 of the compartment 29 and the outer lead of the elevator chain. It is to be noted that the buckets are only slightly spaced from the wall 30 so that potatoes when gravitated from one bucket will rest on the bucket adjacent thereto, so that the potato on the bucket next to the receiving bucket in the gutter 26′ will drop through the chute 35 between the wall 34 and the gutter end and a straight wall depending from the gutter end 26′ of the fixed section 18 of the false bottom for the hopper. From the chute the potatoes will be delivered into a seed spout 36, the said spout being directed between the plow and the covering discs of the lister.

The shaft for the sprocket wheel 32 is indicated for distinction by the numeral 37 and has fixed on the end thereof which projects through the casing of the improvement a sprocket wheel 38. The shaft for the front wheels of the lister has fixed thereon a sprocket wheel 39, and trained around this sprocket wheel and the sprocket wheel 26 there is an endless chain 40. This chain 40 also engages the teeth of the sprocket wheel 38, there being a suitable grooved guide wheel 41 on the frame 11 for directing the angle portion of the lower lead of the chain around the said sprocket wheel 38 and also properly guiding the chain from the sprocket wheel 39.

It is believed that the simplicity of my construction, the operation thereof and its advantages will be understood and appreciated by those skilled in the art to which such invention relates after the foregoing description has been carefully read in connection with the accompanying drawings. It will be noted that with my improvement the sliced potatoes are singly collected, elevated and delivered into the spout 36. The buckets on the elevator are so arranged that the potatoes delivered into the trough cannot escape directly into the trough. The distance between the inner lead of the elevator and the wall 28 is materially greater than the distance between the outer lead of the elevator and the wall 30 so that should more than one potato be gathered by any of the buckets the same during the elevation thereof will drop through the space thus provided back into the hopper. The improvement may be easily and quickly clamped on the frame of a lister. The potatoes may be planted at desired distances apart by employing a larger or smaller sprocket wheel on the drive shaft. Of course, the sprocket 38 on the drive shaft 37 is removable and can be connected to any drive sprocket on the lister.

Having described the invention, I claim:

1. A potato planting attachment for listers, comprising a hopper which is clamped on the lister frame, and which has a false bottom including a fixed section and a hinged section therein, a hinger directing plate over the hinged section of the bottom, a spring normally swinging the hinged section away from the directing plate, a shaft having a lug thereon for contact with the false bottom section when the shaft is turned, the fixed bottom section merging into a rounded trough, an inclined elevator compartment at the forward end of the hopper, an endless chain elevator therein and having its outer lead disposed parallel with and at the same angle as the outer wall of the compartment, said elevator having buckets fixed on the leads thereof, all of which designed to successively travel through the gutter, a chute in the compartment outward of the gutter, a spout connected with the chute, in combination with means for imparting movement to the elevator and to the shaft.

2. A potato planting attachment for listers, comprising a hopper, clamps on the hopper for securing the same to the frame of a lister, a seed support arising from but connected to the bottom of the hopper, said hopper having an inclined false bottom therein that includes a fixed section and a hinged section, a directing plate hingedly secured on the rear wall of the hopper and disposed over the hinged section of the false bottom, a wear plate on said bottom section, a spring for influencing the hinged bottom section away from the directing plate, a shaft having a lug thereon for contacting with the wear plate, the fixed section of the false bottom being arranged nearer the bottom of the hopper and merging into a rounded end that provides a gutter, said hopper having an outer inclined face and having an elevator compartment projecting from the center of the said inclined face, and the outer wall of the compartment being disposed angularly whereby the compartment gradually increases in width from the bottom to the top thereof and the front wall of the hopper having an opening through the lower portion thereof which communicates with the compartment, an endless chain elevator in the compartment, having its outer lead arranged parallel with the outer wall of the compartment, buckets on the links of the chain elevator, designed to successively travel through the gutter, a chute between the gutter and outer wall of the compartment, a spout connected to the chute, in combination with means for driving the elevator and for revolving the shaft.

In testimony whereof I affix my signature.

RICHARD VIRGIL ROBERTSON.